United States Patent Office 3,322,580
Patented May 30, 1967

3,322,580
HARD FACING METALS AND ALLOYS
Alan George Haynes, Badgers Mount, Sevenoaks, Kent, England, assignor to The International Nickel Company, Inc., New York, N.Y., a corporation of Delaware
No Drawing. Filed Sept. 22, 1964, Ser. No. 398,435
Claims priority, application Great Britain, Sept. 24, 1963, 37,543/63
2 Claims. (Cl. 148—142)

The present invention relates to surfacing of metals and alloys and, more particularly, to surfacing of metals and alloys with hard facing materials.

It is well known that abrasion or wear resistant surfaces can be provided on metals and alloys not themselves abrasion and wear resistant by a species of surfacing treatment known as hard facing. In this well known process, a surface layer of a hard metal or alloy is deposited on a softer metal or alloy by a direct fusion technique, by spray coating which may be followed by bonding, or by any one of a number of hard facing processes, examples of which may be found in the Welding Handbook, 4th edition, Section 3, chapter 44 (1959).

Now, it would be indeed desirable to form the composite article so produced into one of desired dimension by simple machining techniques. However, the hard facing deposits of the prior art are usually intrinsically hard, i.e., have a Rockwell "C" hardness above about 45 which corresponds to about 450 D.P.N. (diamond pyramid hardness number) and the composite article cannot be shaped by ordinary machining operations but only by the slow and incovenient process of grinding. For example, it is known that certain cobalt-base alloys used for wear and abrasion resistant purposes have hardness levels of the order of Rockwell "C" 45 to 60 in the as-deposited condition. As indicated above, such materials are excessively hard for good machining practice. On the other hand, some cobalt-base alloys manifest a Rockwell "C" hardness level below 45 and can thus be machined with less difficulty. However, this hardness level cannot be increased, as a practical matter, to afford improved wear and abrasion resistant characteristics. Prior art instances where a high level of hardness could be obtained often involved a quenching treatment, a treatment which gives rise to distortion problems, e.g., warping or dimensional change of the final product. Further, hard surfacing materials used heretofore lack good toughness characteristics. That is to say, the hard surfaces are brittle and will not afford any appreciable resistance, for example, to fatigue. The instant invention includes providing surfaces which are not only hard and wear resistant but which are also tough.

Although attempts were made to overcome the foregoing difficulties and disadvantages, none, as far as I am aware, was entirely successful when carried into practice commercially on an industrial scale.

It has now been discovered that the use of special age-hardenable alloys as hard facing materials provides a composite article which can be easily machined in the solution heat treated condition and subsequently made abrasion and wear resistant by aging.

It is an object of the present invention to provide a process for the hard facing of metals and/or alloys with age-hardenable alloys to thereby achieve a machinable surface which is readily amenable to a hardening treatment such that a combination of characteristics, including abrasion resistance, wear resistance and toughness is attained.

Another object of the invention is to provide a process for hard facing with age-hardenable ferrous-base alloys.

The invention also contemplates providing a process for hard facing with maraging steels.

It is a further object of the invention to provide articles of manufacture having hard facings of age-hardenable alloys.

Other objects and advantages will become apparent from the following description.

Generally speaking, the present invention contemplates the provision of a wear and abrasion resistant, tough surface on a metal or alloy base by the deposition of an age-hardenable alloy. As contemplated herein, the designation age-hardenable alloys refers to alloys in which a precipitable phase substantially dissolves in a matrix when heated to an elevated temperature and the phase is retained in solution upon cooling at an appropriate rate; these steps comprise what is commonly referred to as a solution heat treatment which places the alloy in the solution heat treated condition. Upon reheating to a lower temperature (aging treatment) the precipitate comes out of solution. In the solution heat treated condition (which includes the as-deposited condition) the alloys in accordance with the present invention are characterized by a hardness of less than 450 D.P.N. and advantageously less than about 350 D.P.N., e.g., 300 D.P.N. Thus, the alloys are soft enough to be machined with relative ease and any necessary shaping is then readily performed. The age-hardenable alloy is subsequently hardened by a suitable heat treatment. Prior to hardening the as-deposited alloy, it is advantageous to further solution heat treat the alloy whereby an improved combination of hardness and toughness is obtained.

To avoid distortion of the composite article, the alloy used for surfacing is preferably one that can be aged by heating at a low temperature, e.g., below about 760° C. and preferably below about 593° C., and which is thereafter cooled, e.g., air or furnace cooled, without the necessity of a quenching treatment to achieve the desired level of hardness. For purposes of the present invention, examples of suitable age-hardenable alloys include the nickel-chromium alloys, such as those sold under the well known trademarks Nimonic and Inconel and which contain about 10% to 35% chromium, up to 10% molybdenum, up to 10% of the age-hardenable elements titanium and/or aluminum, up to 30% cobalt, up to 15% tungsten, up to 0.1% boron, up to 1% zirconium, with the balance essentially nickel and other commonly employed constituents; the age-hardenable martensitic stainless steels containing 12% to 18% chromium, nickel in an amount up to 8%, titanium and/or aluminum in amounts up to 1.5%, together with up to 5% copper, up to 3% molybdenum, up to 2% columbium, the balance being essentially iron. Also included are the semi-austenitic and austenitic age-hardenable stainless steels. The elements copper, molybdenum, titanium, aluminum, columbium, etc., confer, as is well known, age-hardenable characteristics to the aforementioned stainless steels. With regard to the hardening elements, it should be mentioned that while a satisfactory level of precipitation hardening can be obtained for certain applications utilizing normal amounts of the hardening elements, e.g., 1% aluminum, 2% molybdenum, 4% copper, etc., it is preferable to insure that the additions of these elements are at the high end of their usual ranges to thus achieve high hardness levels in the aged condition. It should be mentioned that in regard to the age-hardenable steels which are martensitic or substantially martensitic in the solution heat treated condition, the carbon content of such alloys should not exceed 0.07%. This is advantageous in achieving hardness levels of not greater than 350 D.P.N. and thus contributes to ease of machinability.

Suitable base or foundation metals and/or alloys include the well known plain and medium carbon steels, and the low carbon alloy steels. The martensitic, semi-austenitic and austenitic stainless steels and nickel-base alloys can also be used as foundation materials where desired. The base material can also be an age-hardenable alloy which on aging does not harden to the same extent as the allow used for surfacing.

In carrying the invention into practice, it is most advantageous to use as the hard facing material an alloy that can be aged in the martensitic condition to develop very high hardness. In this specification, the term "martensitic" is used to described those alloys which have or can be caused to have a matrix structure composed substantially of martensite prior to aging, and the term "martensite" includes low temperature transformation products of austenite.

Alloys that can be aged in the martensitic state include the recently developed maraging steels which are particularly notable for their toughness in the aged condition. In one family of such steels, the precipitable phase is based on titanium and/or aluminum. These steels contain about 18% to about 30% nickel, about 1.5% to about 9% in all of titanium and/or aluminum, e.g., 1.5% to 3% or 5% of aluminum and/or titanium, with or without other elements. Some of these steels are described and claimed in U.S. Patent No. 3,093,518. When such steels contain from about 18% to about 23% or even about 24% nickel together with up to 5% titanium and/or aluminum, they become martensitic on cooling to a temperature at least below about 32° C., after being held at a temperature in the range of about 760° C. to about 1177° C. for 0.25 hour or longer, e.g., one hour. After this treatment, the steels are in the solution treated condition and can be readily machined. Aging of these steels is accomplished by heating for from ¼ hour to 24 hours at a temperature of about 260° C. to about 649° C., preferably not above about 538° C. It is advantageous to use these steels containing no more than 24% nickel as the surface layers in the invention because of the ease with which they may thus be hardened.

In the family of steels just discussed, those containing from above about 24% to about 30% nickel can be solution heat treated by heating to a temperature in the range of about 760° C. to about 1177° C. for 0.25 hour or longer, e.g., one hour. The aging of these steels is accomplished in two steps. First they are ausaged by subjecting them to a temperature above the martensitic transformation range and within the range of from about 593° C. to about 760° C. for a period of from 1 to 24 hours, and cooling to at least below about 32° C. to produce a martensitic structure. A subsequent final aging is accomplished by holding the steel for from ¼ hour to 24 hours in the temperature range of about 260° C. to about 649° C., preferably not above about 538° C. These steels can be hardened to very high values, e.g., up to about 65 $R_c$ (about 830 D.P.N.), and before being ausaged can readily be machined. It is advantageous, therefore, to use such steels as the surface layers when very high final hardness is required, even though the heat treatment is more complex; otherwise, the nickel content of these steels should not exceed 23% or 24% to thus enable the steels to be hardened by a one-step aging treatment.

Another family of maraging steels depends primarily upon molybdenum and cobalt for the hardening, though additional hardening may be imparted by one or more of other elements, namely, carbon, silicon, titanium, aluminum, copper, tungsten, niobium, vanadium, beryllium and nitrogen. These steels preferably contain from 10% to 23% nickel, from 1% to 10% molybdenum, and from 2% to 30% cobalt with or without other elements, e.g., titanium and/or aluminum in an amount up to 3% of each, and are described in detail in U.S. Patent No. 3,093,519. The steels in this family are in the solution heat treated condition after heating in the range of from about 704° C. to about 1093° C. for about 0.1 to about 10 hours, followed by cooling to room temperature or below to induce a martensitic transformation. Cold working can also be employed to promote the transformation. The steels are subsequently aged by heating for about 0.1 hour to about 100 hours at a temperature of about 260° C. to about 593° C. The hardness of these steels after aging depends upon the content of the hardening elements, i.e., those that enter the composition of the phases precipitated on aging, and particularly upon the contents of molybdenum, cobalt and titanium.

It should be noted that the aforementioned maraging steels, as well as the other age-hardenable alloys encompassed by the present invention, may be placed in substantially the equivalent of the solution heat treated condition merely by allowing them to cool to a sufficiently low temperature after deposition. In other cases, the condition obtained upon cooling from hot working could be considered as a substantial equivalent of the solution heat treated condition. For the purposes of this invention the step of cooling after deposition or cooling after hot working shall be considered a solution heat treatment step.

When the surface layer is deposited by fusion, care must be taken that the alloy is not diluted by the foundation metal to such an extent that its ability to harden is greatly diminished or lost, and for this reason it may be necessary to effect the deposition in two stages. In a two stage deposition, or even in a deposit under normal conditions where the previous run has had an opportunity to cool to below about 300° C., the heating that takes place when the second layer or run is deposited may bring about some hardening of the initially deposited material and thereby make it more difficult to machine the whole deposit. If excessive hardening occurs for this reason, the alloy may be softened again for machining by solution heat treating.

The aging of the hard facing is normally effected by aging the whole article but if this would have any adverse effect on the foundation, the facing may be hardened by local heating.

The nature of the foundation metal or alloy to which the surface layer is applied is not critical and depends on the properties required in the article that is to be hard faced. Often this foundation will be of carbon or low alloy steel, but it may itself be of an alloy hardenable by precipitation to possess a good combination of toughness and strength while lacking the hardness that can be developed in the facing. If the carbon or low alloy hardenable steels contain more than about 0.15% carbon, it may be necessary, in order to avoid excessive hardening or cracking at the interface between the surface layer and the foundation material or alloy, to take precautions similar to those normally employed in welding steels of carbon contents above this level. Such precautions usually involve preheating or slow cooling after deposition or coating, neither of which will reduce the hardness of the deposit or coating significantly.

For the purpose of giving those skilled in the art a better understanding and/or a better appreciation of the advantages of the invention, the following illustrative examples are given:

*Example I*

A ½-inch thick mild steel plate was provided with a hard facing of maraging steel by the fine-wire process in which a 3/16 to ¼-inch thick surface layer was deposited by the fusion of a wire 0.03 inch in diameter in an electric arc under an argon shield. The composition of the wire is set forth in Table I.

TABLE I

| Element: | Weight, percent |
|---|---|
| Nickel | 18.28 |
| Cobalt | 8.50 |
| Molybdenum | 4.83 |
| Titanium | 0.39 |
| Carbon | 0.02 |
| Aluminum | 0.1 |
| Manganese | 0.02 |
| Silicon | 0.03 |
| Sulfur | 0.005 |
| Phosphorus | 0.004 |
| Calcium | <0.01 |
| Boron | <0.002 |
| Zirconium | N.D. |

N.D.=not detected.

The hardness of the steel as deposited was 320 D.P.N., and after aging at about 480° C. for three hours, it was hardened to 515 D.P.N.

*Example II*

Maraging steel hard facings were deposited on several base plate materials using a filler wire of the nominal composition shown in Table II.

TABLE II

| Element: | Weight, percent |
|---|---|
| Nickel | 18 |
| Cobalt | 8 |
| Molybdenum | 5 |
| Titanium | 2.2 |
| Carbon | 0.03 |
| Aluminum | 0.1 |
| Silicon | 0.1 |
| Manganese | 0.1 |
| Sulfur | 0.01 |
| Phosphorus | 0.01 |

Details of the base plate material used in each case, the deposition process and the post-deposition heat treatment employed, and the results of hardness surveys made across the weld interfaces of samples cut from each of the hard faced plates are set forth in Table III. The post-deposition heat treatment is designated by the number of hours of holding at a particular temperature, e.g., 3 h./480° C. signifies that the sample was heated to 480° C. and held at that temperature for a period of three hours. After each furnace treatment, the samples were air cooled.

Samples Nos. A1 and C1 are representative of the hardness achieved in the as-deposited condition. Samples Nos. A2, B1, C2 and D1 illustrate the results of a simple aging treatment. Samples Nos. A3, B2, B3, C3, D2 and D3 were solution heat treated after deposition and then aged. Sample No. A4 was solution heat treated and then given a complex aging treatment, including ausaging and final aging. Sample No. A5 was solution heat treated and then given a complex aging treatment, including sub-zero cooling and final aging. Sample No. B4 was given a complex aging treatment subsequent to deposition, including ausaging and final aging, and Sample No. D4 was given a complex aging treatment subsequent to deposition, including sub-zero cooling and final aging.

Instead of depositing the surface layer by a welding technique or by spray coating, a hot-dipping technique may be employed in which the foundation metal or alloy, which must have a melting point not greatly different from the surfacing alloy, is dipped into a molten bath of the surfacing alloy to produce a layer of the desired thickness. Some fusion or bonding will occur at the interface. In order to obtain a good bond, precautions must be taken to avoid oxidation of the surface of the foundation metal, and care must also be taken to avoid loss by oxidation of the hardening elements from the molten surfacing alloy.

It is an advantage of the process of the invention when used to coat carbon steels, that the hard layers or zones produced as a result of low temperature transformations in the carbon containing zones of the interface and foundation material will be tempered to a lower hardness and to increased ductility simultaneously with the aging of the deposited layer.

The present invention is particularly applicable to metal forming and metal working equipment, gears, dies, paddles and impellers. Such materials can be provided with extremely high hardness levels in accordance herewith, e.g., 450 D.P.N to 600 D.P.N. and higher, e.g., 500 D.P.N. In any event, the hardness level upon aging should not be less than 350 DP.N.

Although the present invention has been described in conjunction with preferred embodiments, it is to be understood that modifications and variations may be resorted to without departing from the spirit and scope of the invention, as those skilled in the art will readily understand. Such modifications and variations are considered to be within the purview and scope of the invention and appended claims.

TABLE III

| Base Plate | Base Plate Material and Thickness | Deposition Process [1] | No. of Layers Deposited | No.[2] | Post-Deposition Heat Treatment | Hardness Maximum D.P.N. | Hardness Average D.P.N. |
|---|---|---|---|---|---|---|---|
| A | Maraging Steel ⅜ in. | M.I.G. | 3 | A1 | None | 389 | 375 |
|   |   |   |   | A2 | 3 h/480° C. | 518 | 508 |
|   |   |   |   | A3 | 1 h/820° C., 3 h/480° C. | 568 | 547 |
|   |   |   |   | A4 | 1 h/820° C., 4 h/700° C., 3 h/480° C. | 657 | 631 |
|   |   |   |   | A5 | 1 h/820° C., 36 h/−196° C., 3h/ 480° C. | 705 | 672 |
| B | Mild Steel ¾ in. | M.I.G. | 3 | B1 | 3 h/480° C. | 520 | 501 |
|   |   |   |   | B2 | 1 h/820° C., 3 h/480° C. | 568 | 535 |
|   |   |   |   | B3 | 4 h/1,200° C., 3 h/480° C. | 635 | 618 |
|   |   |   |   | B4 | 4 h/700° C., 3 h/480° C. | 659 | 622 |
| C | Mild Steel ⅜ in. | M.I.G. | 3 | C1 | None | 373 | 329 |
|   |   |   |   | C2 | 3 h/480° C. | 554 | 506 |
|   |   |   |   | C3 | 4 h/1,200° C., 3 h/480° C. | 631 | 590 |
| D | Mild Steel ¾ in. | T.I.G. | 5 | D1 | 3 h/480° C. | 564 | 510 |
|   |   |   |   | D2 | 1 h/820° C., 3 h/480° C. | 579 | 533 |
|   |   |   |   | D3 | 4 h/1,200° C., 3 h/480° C. | 639 | 567 |
|   |   |   |   | D4 | 48 h/−196° C., 3 h/480° C. | 610 | 518 |

[1] M.I.G.-consumable-metal-arc process. T.I.G.-argon-shielded tungsten-arc process.
[2] Sample Number.

I claim:
1. In the process of hard facing metals and alloys to obtain a readily machinable surface which can be aged to develop the properties of wear and abrasion resistance and toughness the steps comprising, providing a metallic member having at least one surface upon which a hard facing is desired, depositing upon at least said one surface at least one adherent layer of a steel containing about 18% to about 30% nickel and about 1.5% to about 9% of metal selected from the group consisting of aluminum and titanium, said steel being characterized by a hardness below about 450 D.P.N. in the solution heat treated condition and being further characterized by the capability of being aged to a hardness above about 500 D.P.N., solution heat treating said adherent layer, machining said adherent layer while in the solution heat treated condition and thereafter aging said adherent layer to a hardness above about 500 D.P.N.

2. In the process of hard facing metals and alloys to obtain a readily machinable surface which can be aged to develop the properties of wear and abrasion resistance and toughness the steps comprising, providing a metallic member having at least one surface upon which a hard facing is desired, depositing upon at least said one surface at least one adherent layer of a steel containing about 10% to about 23% nickel, about 1% to about 10% molybdenum, about 2% to about 30% cobalt and up to about 3% titanium, said steel being characterized by a hardness below about 450 D.P.N. in the solution heat treated condition and being further characterized by the capability of being aged to a hardness above about 500 D.P.N., solution heat treating said adherent layer, machining said adherent layer while in the solution heat treated condition and thereafter aging said adherent layer to a hardness above about 500 D.P.N.

References Cited

UNITED STATES PATENTS

| | | | |
|---|---|---|---|
| 2,941,882 | 6/1960 | Franklin et al. | 75—123 |
| 3,012,880 | 12/1961 | Elbaum et al. | 75—126 |
| 3,093,518 | 6/1963 | Bieber | 148—31 |
| 3,093,519 | 6/1963 | Decker et al. | 148—142 X |
| 3,132,938 | 5/1964 | Decker et al. | 148—142 X |
| 3,147,747 | 9/1964 | Kittelson | 123—188 |

DAVID L. RECK, *Primary Examiner.*

CHARLES N. LOVELL, *Examiner.*